United States Patent [19]
Stovall et al.

[11] Patent Number: 6,047,193
[45] Date of Patent: Apr. 4, 2000

[54] SYSTEM AND METHOD FOR LOCATING A SWITCH COMPONENT

[75] Inventors: Gregory T. Stovall; David Wesley McKnight, both of Garland, Tex.

[73] Assignee: Northern Telecom Limited, Montreal, Canada

[21] Appl. No.: 08/968,272

[22] Filed: Nov. 12, 1997

[51] Int. Cl.[7] .................................................. H04Q 7/20
[52] U.S. Cl. ........................... 455/456; 455/424; 379/25
[58] Field of Search .................................... 455/456–457, 455/423–424, 422, 67.1, 67.7, 31.2; 329/22, 25, 325, 328–330, 326, 201; 340/539

[56] References Cited

U.S. PATENT DOCUMENTS

| | | | |
|---|---|---|---|
| 3,739,329 | 6/1973 | Lester | 455/456 X |
| 5,334,974 | 8/1994 | Simms et al. | 340/990 |
| 5,394,459 | 2/1995 | Djuphammar et al. | 455/424 X |
| 5,448,221 | 9/1995 | Weller | 455/67.7 X |
| 5,448,675 | 9/1995 | Leone et al. | 379/25 X |
| 5,515,426 | 5/1996 | Yascenda et al. | 379/201 |
| 5,608,412 | 3/1997 | Welles, II et al. | 455/517 X |
| 5,742,666 | 4/1998 | Alpert | 455/404 |
| 5,812,934 | 9/1998 | Hard et al. | 455/31.2 |

*Primary Examiner*—William G. Trost
*Attorney, Agent, or Firm*—Haynes & Boone, L.L.P.

[57] ABSTRACT

A system and method for locating a specific component of a facility by using differential signaling. The system works in a facility such as a central office having many components, such as line cards. The central office includes several wireless transmitters for transmitting signals inside the office. Attached to each line card is a positioning device, which has a receiver for receiving the transmitted signals, a controller for converting the transmitted signals into location information, and a sender for transmitting the location information. The central office also includes a computer with a device for receiving the transmitted location information. As a result, the computer can provide to a user the location of the component inside the facility.

11 Claims, 2 Drawing Sheets

SYSTEM AND METHOD FOR LOCATING A SWITCH COMPONENT

TECHNICAL FIELD

This invention relates generally to switching systems, and in particular, to a system and method for locating one of many components in the switching system by using differential signaling.

BACKGROUND OF THE INVENTION

A conventional public switched telephone network ("PSTN") is formed by routing trunks or lines between various switching systems. The switching systems are often physically grouped together to form a central office. A central office may connect any combination of lines and trunks, and therefore can by used in local switching systems (for interconnecting lines and trunks) and network switching systems (for interconnecting trunks). For purposes of simplicity, only a local switching system for interconnecting lines and trunks will be further discussed.

Often, a single central office switches literally hundreds or thousands of lines. The central office therefore must arrange the switching hardware in a logical manner so that it may be readily accessed, serviced, or replaced. A typical central office will be housed in a multi-floor building, each floor including several rows of switch frames, each switch frame including several shelves of line cards, and each line card serving multiple lines.

Because of the multiplicity of components in a central office, it is often very difficult to find a particular line card to access, service, or replace. To relieve this difficulty, several solutions have been implemented to help identify the location for each line card in a central office. One solution is to manually update a written or computer record of each card and its location. However, this solution suffers from human errors inherently obvious. Another solution is to provide line cards that include specialized circuitry to identify the frame to which they are connected and report this identification to a central data processor through one of the data networks used by the central office. However, this solution also has drawbacks. For one, the card-to-frame identification is only a partial description of the card's location. The location of the card inside the frame, as well as the location of the frame in the central office, are needed to further locate the card. Also, there may exist different manufacturers for line cards, some of which may not provide the above described specialized circuitry. Furthermore, such specialized circuitry can not be readily adapted to existing cards as well as to new cards that do not have the circuitry. Further still, for various reasons, it may not be desirable to utilize any of the data networks in the central office.

Therefore, what is needed is a system and method that provides an exact location of a line card inside a central office.

Furthermore, what is needed is a system and method that can be easily adapted to new as well as existing line cards.

Further still, what is needed is a system and method that can operate without having to use an existing data network.

SUMMARY OF THE INVENTION

The foregoing problems are solved and a technical advance is achieved by a system and method for locating a specific component of a facility by using differential signaling. In one embodiment, the system works in a facility such as a central office having many components, such as line cards. The central office includes several wireless transmitters for transmitting signals inside the office. Attached to each line card is a positioning device, which has a receiver for receiving the transmitted signals, a controller for converting the transmitted signals into location information, and a sender for transmitting the location information. The central office also includes a computer with a device for receiving the transmitted location information. As a result, the computer can provide to a user the location of the component inside the facility.

DESCRIPTION OF THE PREFERRED EMBODIMENT

Figure 1:
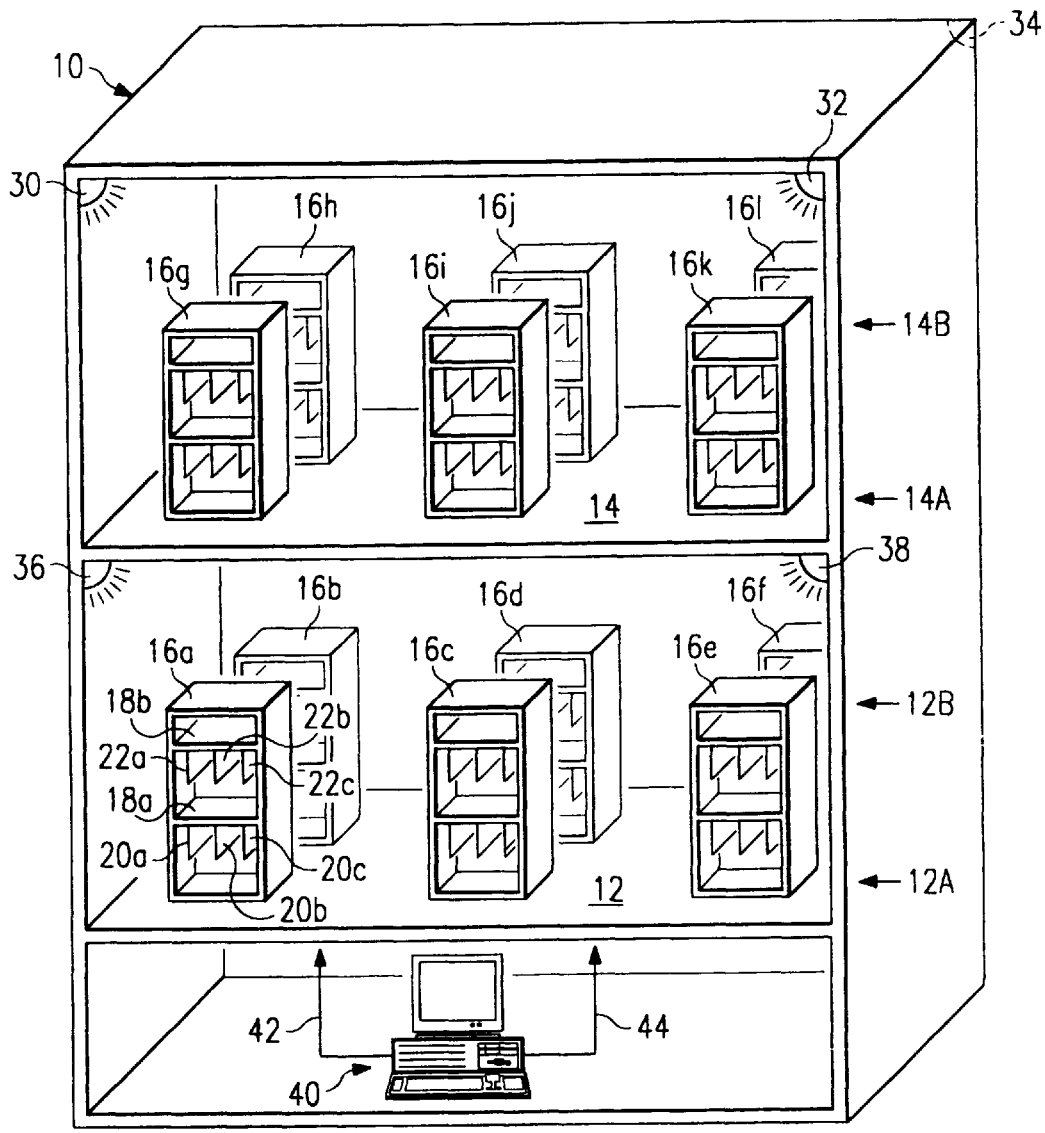
FIG. 1 illustrates an exemplary, simplified central office.

Referring to FIG. 1, the reference numeral 10 designates a central office for utilizing one embodiment of the present invention. The central office 10 includes two floors 12, 14, each of which including two rows 12A, 12B, and 14A, 14B, respectively, of frames 16*a*–16*l*. Each of the frames 16*a* –16*l* are similarly configured as shown by representative frame 16*a* having two shelves 18a and 18b, each having three line cards 20*a*, 20*b*, 20*c* and 22*a*, 22*b*, 22*c*, respectively.

The central office 10 also includes several low power spread-spectrum transmitters 30, 32, 34, 36, 38. The transmitters are strategically placed throughout the central office 10 so that each line card of each frame 16*a*–16*l* can receive signals from at least three of the transmitters. The transmitters 30–38 are all tightly synchronized, with each transmitter emitting a unique signal. The signals are similar to the signals provided by global positioning satellites, thereby providing any receiver with at least three signals to triangulate its exact location. It is understood that the placement of the transmitters is subject to unique RF characteristics of the central office 10, which can be readily determined by one of ordinary skill in the art.

The central office 10 also includes a central processing facility 40 for receiving and processing, among other things, location information from each of the line cards. In one embodiment, the central processing facility 40 is a computer that receives the location information through a data bus 42 connected to each of the line cards. The data bus 42 may represent a bus dedicated for the functions described herein, or it may represent available bandwidth on an existing bus such as an Ethernet bus. In another embodiment, the central processing facility 40 receives the location through a radio frequency (RF) receiver antenna 44.

Figure 2:
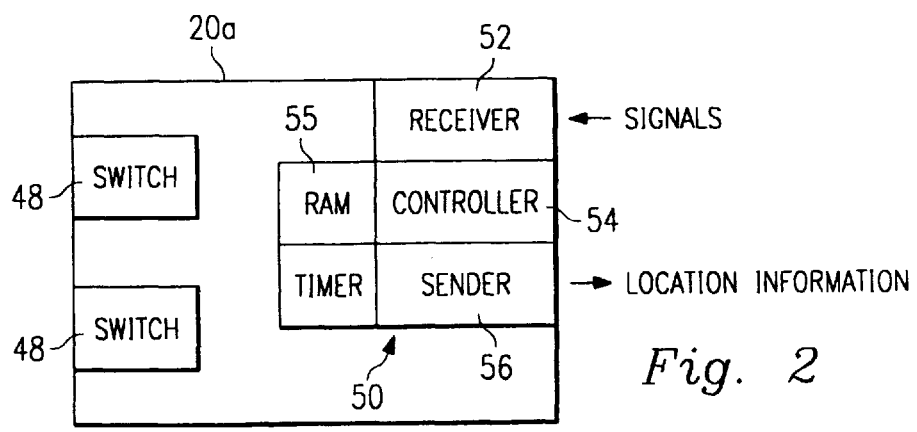
FIG. 2 illustrates a line card of the central office of FIG. 1.

Referring to FIG. 2, each of the line cards, as represented by the line card 20*a*, includes a plurality of conventional switching components 48 and a positioning device 50. The positioning device is relatively self-contained, except that it may be connected to a power supply (not shown) of the line card 20*a*.

The positioning device 50 includes a receiver 52 for receiving the signals transmitted by one or more of the transmitters 30–38, a controller 54 for interpreting the received signals into location information and temporarily storing the location information in random access memory (RAM) 55, and a sender 56 for transmitting the location information to the central processing facility 40. In the preferred embodiment, the sender 56 is programming in the controller 54 for transmitting the location information. In alternative embodiments, the sender may be a separate device, depending on the type of transmitting. Also, the RAM 55 contains a number that is unique for each card. For example, the RAM 55 may be connected to a group of dip switches or identification chip that is uniquely configured for the line card 20a. Conventionally, the central office 10 may include a system in which each line card includes a number identification that it uses to report failures through an existing data network. Therefore, it is advantageous if the identification information used by the present embodiment correlates with the number identification already used to identify the line card. The positioning device 50 also includes a timer 58, which will be described later with reference to FIG. 3.

In one embodiment, the sender 56 is connected to the data bus 42, thereby providing a direct physical link to the central processing facility 40. In this embodiment, the positioning device 50 may alternatively receive power from the bus 42, and will therefore not need to be connected to the power supply of the line card 20a. In another embodiment, the sender 56 is an RF transmitter for sending the location information through radio signals to the antenna 44.

Figure 3:
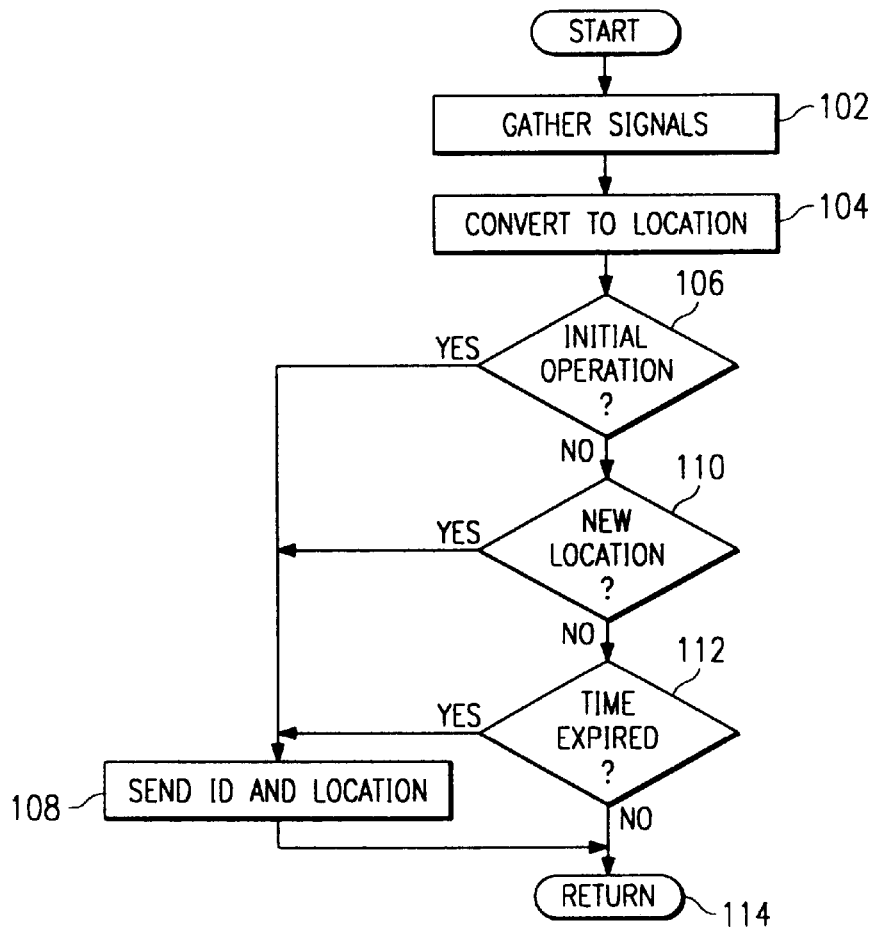
FIG. 3 is a flow chart of a routine performed by a position device attached to the line card of FIG. 2.

Referring to FIG. 3, the controller 54 repeatedly performs a routine 100. At step 102, the controller receives the signals from the receiver 52. At step 104, the controller 54 converts the signals to location information and stores the location information in RAM 55. At step 106, the controller 54 determines if this is an initial operation of the positioning device 50. Such determination may be made, for example, by checking the RAM 55 to see if any other location information has been previously stored. If this is an initial operation, execution proceeds to step 108 where the controller supplies the location information and the identification information to the sender 56, which then transmits this information to the central processing facility 40.

If at step 106 it is determined that this is not an initial operation, execution proceeds to step 110. At step 110, the controller 54 compares the currently received location information with the previously received location information. If the two differ by more than a predetermined amount, the line card 20a has moved and execution proceeds to step 108 described above. Otherwise, execution proceeds to step 112 where the controller 54 checks the timer 58 to see if a predetermined period of time has elapsed since the last time the location information was sent. If so, execution proceeds to step 108 described above and the central processing facility 40 is continually updated with the location information and the identification information. In this way, if the central processing facility 40 includes, for example, a laptop computer acting as a remote terminal, the laptop computer receives the information soon after it is turned on inside the central office 10. If the predetermined period of time has not elapsed, or upon completion of step 108, execution proceeds to step 114 in which the routine 100 either stops temporarily, or returns to step 102.

Figure 4:
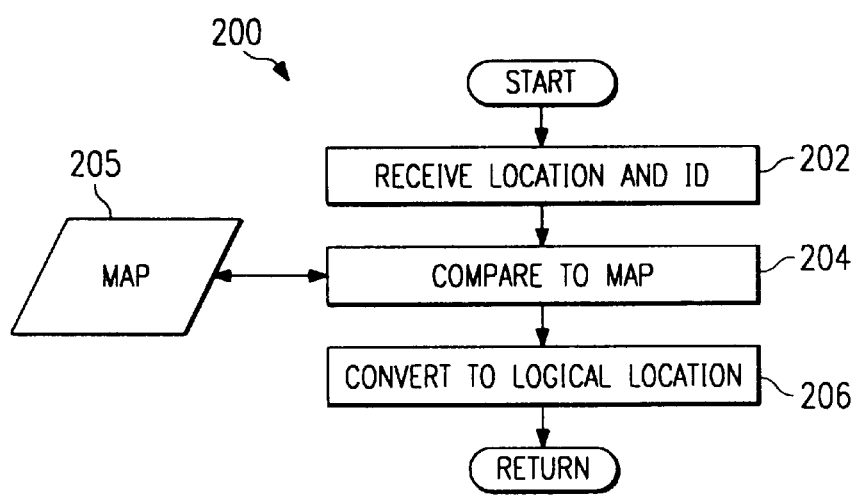
FIG. 4 is a flow chart of a routine performed by a central processing facility of the central office of FIG. 1.

Referring to FIG. 4, the central processing facility 40 repeatedly performs a routine 200. At step 202, the central processing facility receives the location information and identification information from each line card of the central office 10. At step 204, the central processing facility 40 compares the location information with a map database 205. At step 206, the central processing facility 40, using the map database 205, converts the location information to a physical location that can be easily used by an individual. For example, line card 20c can be mapped to:

(floor 1, row 1, frame 1, shelf 2, card 3).

As a result, an individual can easily locate the appropriate line card for repair or replacement. In the preferred embodiment, the identification information provided to the central processing facility 40 by each line card correlates directly with the identification number used for reporting errors, mentioned earlier. Therefore, the individual now knows exactly which card has errors and where it is located.

Although illustrative embodiments of the invention have been shown and described, other modifications, changes, and substitutions are intended in the foregoing disclosure. For example, the positioning device 50 can be attached to the frame or shelf instead of the line card. In this way, the individual can be directed to the correct frame or shelf, and then locate the line card that needs attention using other means. Furthermore, the above described embodiment can be easily implemented in different components besides line cards. Accordingly, it is appropriate that the appended claims be construed broadly and in a manner consistent with the scope of the invention.

What is claimed is:

1. A system for locating a component inside a facility comprising:
    a plurality of wireless transmitters located in a predefined area of the facility for transmitting signals;
    a positioning device attached to the component, the positioning device including a receiver for receiving the transmitted signals, a controller for converting the transmitted signals into location information, and a sender for transmitting the location information;
    a device for receiving the transmitted location information into a processor, wherein the processor can use the transmitted location information to identify a specific location within the predefined area;
    a map to which the processor may convert the location information into a physical coordinate for locating the component at the specific location, wherein the component is located in a rack, and the physical coordinate identifies a position within the rack.

2. A method for finding a component having a positioning device and located in a central office having a central device, the method comprising:
    a) the positioning device performing the steps of:
        I) receiving at least three radio frequency (RF) signals from which a specific location can be determined;
        ii) converting the RF signals into location information identifying a specific location;
        iii) storing the location information;
        iv) receiving an identifier for identifying the component;
        v) transmitting the location information and identifier to the central device;
    b) the central device performing the steps of:
        I) receiving the location information and identifier;
        ii) correlating the location information to a specific component;
        iii) providing the correlated location information.

3. The method of claim 2 wherein step b), ii) uses a map to convert the location information to a physical coordinate.

4. The method of claim 2 wherein the location information and identifier are transmitted through a data bus.

5. The method of claim 2 wherein the location information and identifier are transmitted by wireless communication.

6. The method of claim 2 wherein the location information and identifier are transmitted upon the occurrence of either initial operation of the positioning device, an elapsed period of time, or detection that the component has moved within the facility.

7. The method of claim 2 wherein the facility contains a plurality of similar components.

8. The method of claim 2 wherein the signals are provided by low power spread spectrum wireless transmitters located in the facility.

9. The method of claim 2 further comprising the step of attaching the positioning device to the component.

10. The method of claim 2 wherein the positioning device further performs the step of:
   vi. comparing the location information to previously stored location information; and
   wherein the location information and identifier are transmitted to the central device only if the location information is different from the previously stored location information.

11. A method for finding a component having a positioning device and located in a facility having a central device, wherein the facility is a central office that contains a plurality of components which are line cards, the method comprising:
   a) the positioning device performing the steps of:
      I) receiving at least three radio frequency (RF) signals from which a specific location can be determined;
      ii) converting the RF signals into location information identifying a specific location;
      iii) storing the locaton information;
      iv) receiving an identifier for identifying the component;
      v) transmitting the location information and identifier to the central device;
   b) the central device performing the steps of:
      I) receiving the location information and identifier;
      ii) correlating the location information to a specific component;
      iii) providing the correlated location information.

* * * * *